US012605895B2

(12) United States Patent
Zitelli

(10) Patent No.: US 12,605,895 B2
(45) Date of Patent: Apr. 21, 2026

(54) APPARATUS FOR 3D PRINTING COMPRISING AN HYBRID LIGHTING SYSTEM

(71) Applicant: AXTRA3D INCORPORATION, Dover, DE (US)

(72) Inventor: Gianni Zitelli, Padua (IT)

(73) Assignee: AXTRA3D INCORPORATION, Dover, DE (US)

( * ) Notice: Subject to any disclaimer, the term of this patent is extended or adjusted under 35 U.S.C. 154(b) by 0 days.

(21) Appl. No.: 18/866,026

(22) PCT Filed: May 27, 2022

(86) PCT No.: PCT/IT2022/000024
§ 371 (c)(1),
(2) Date: Nov. 14, 2024

(87) PCT Pub. No.: WO2023/228221
PCT Pub. Date: Nov. 30, 2023

(65) Prior Publication Data
US 2025/0170776 A1     May 29, 2025

(51) Int. Cl.
*B29C 64/277* (2017.01)
*B29C 64/286* (2017.01)
(Continued)

(52) U.S. Cl.
CPC .......... *B29C 64/277* (2017.08); *B29C 64/286* (2017.08); *B33Y 30/00* (2014.12);
(Continued)

(58) Field of Classification Search
CPC ... B29C 64/124; B29C 64/129; B29C 64/135; B29C 64/264; B29C 64/268;
(Continued)

(56) References Cited

U.S. PATENT DOCUMENTS

2017/0326786 A1* 11/2017 Yuan ..................... B29C 64/268
2018/0133964 A1* 5/2018 Wiesner ................. B22F 12/44
(Continued)

FOREIGN PATENT DOCUMENTS

JP       2009132124      6/2009
WO       2021166005 A1   8/2021
WO       2023228221 A1   11/2023

OTHER PUBLICATIONS

International Search Report and Written Opinion dated Jan. 4, 2023 regarding PCT/IT2022/000024.
(Continued)

*Primary Examiner* — Jamel M Nelson
(74) *Attorney, Agent, or Firm* — SNELL & WILMER L.L.P.

(57) ABSTRACT

An apparatus for 3D printing an object by photo-curing or selective laser sintering with a hybrid lighting system at a constant wavelength and variable power and speed, wherein said apparatus includes:—a first light source and related optical devices of conditioning the light beam, for the emission and processing of a first light beam for photo-curing or sintering said object, wherein said first light beam has a predetermined wavelength and a linear polarization oriented according to a certain angle;—a second light source and related optical devices of conditioning the light beam, for the emission and processing of a second light beam for photo-curing or sintering said object, wherein said second light beam has a wavelength equal to that of said first light beam and a linear polarization oriented according to an angle orthogonal to that of said first light beam.

9 Claims, 11 Drawing Sheets

Figure 1:
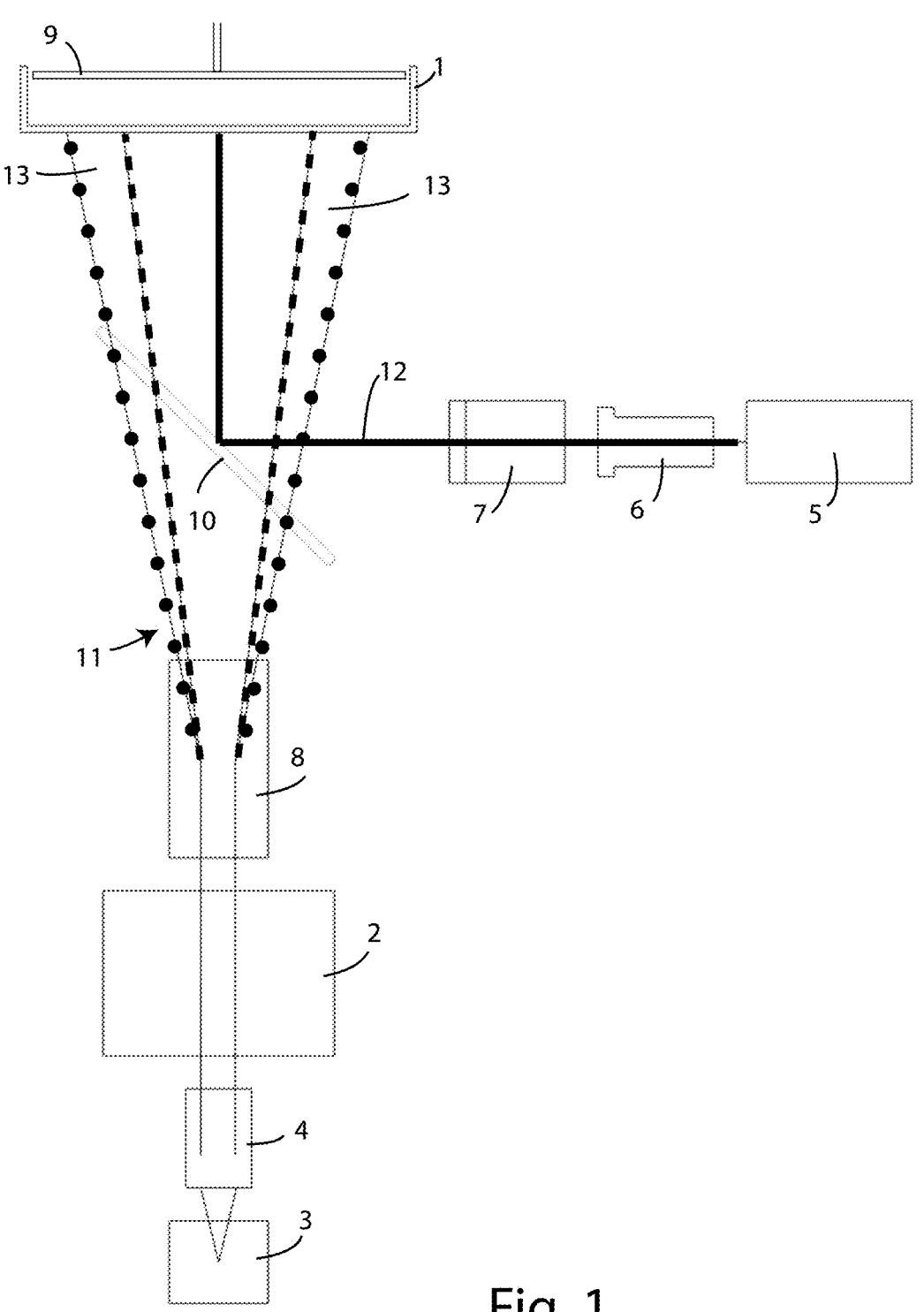

(51) Int. Cl.

| | | |
|---|---|---|
| *B33Y 30/00* | (2015.01) | |
| *B29C 64/129* | (2017.01) | |
| *B29C 64/153* | (2017.01) | |
| *B33Y 10/00* | (2015.01) | |

(52) U.S. Cl.
CPC .......... *B29C 64/129* (2017.08); *B29C 64/153* (2017.08); *B33Y 10/00* (2014.12)

(58) Field of Classification Search
CPC ... B29C 64/273; B29C 64/277; B29C 64/282; B29C 64/286; B33Y 10/00; B33Y 30/00
See application file for complete search history.

(56) References Cited

U.S. PATENT DOCUMENTS

| | | | | |
|---|---|---|---|---|
| 2018/0141160 A1* | 5/2018 | Karp | .................. | B23K 26/0626 |
| 2021/0046586 A1* | 2/2021 | Marshall | ................. | B22F 12/13 |
| 2021/0053280 A1 | 2/2021 | Demuth et al. | | |
| 2021/0387284 A1* | 12/2021 | Holfelder | .............. | B29C 64/268 |
| 2022/0390746 A1* | 12/2022 | Hellman | ............ | G02B 26/0808 |
| 2025/0100220 A1* | 3/2025 | Kono | ................... | G02B 27/283 |

OTHER PUBLICATIONS

Japan Patent Office, Japanese Office Action dated Nov. 11, 2025 in Application No. 2024-569483.
Canadian Intellectual Property Office, Canadian Office Action dated Oct. 10, 2025 in Application No. 3,257,075.

* cited by examiner

APPARATUS FOR 3D PRINTING COMPRISING AN HYBRID LIGHTING SYSTEM

CROSS REFERENCE TO RELATED APPLICATIONS

This application is a U.S. National Phase Application under 35 U.S.C. § 371 of PCT International Application No. PCT/IT2022/000024, filed May 27, 2022 entitled "APPARATUS FOR 3D PRINTING COMPRISING AN HYBRID LIGHTING SYSTEM," the disclosure of which is incorporated herein by reference in its entirety for all purposes.

The present invention concerns a photo-curing or selective laser sintering 3D printing apparatus with a hybrid lighting system at a constant wavelength and variable power and speed, with an optical coupling and expansion system, in particular with an optical pre-or post-coupling and fixed or variable post-expansion system.

The invention refers to the field of three-dimensional printing, commonly called 3D printing, and in particular to 3D printing technologies by photo-curing or selective laser sintering (SLS), both referring to the formation of objects and in particular the first one by curing a particular type of polymer due to exposure to light radiation, this term implying not only the radiations included in the visible spectrum, but also those in the UV field (the radiations belonging to this range of the electromagnetic spectrum being indicated with the abbreviation UV-Vis) and in any case capable of curing the liquid polymer used, and the second one by melting the small particles of a polymer powder through a high-power laser.

For simplicity of description, reference will be made hereinafter in particular to the photo-curing 3D printing technology, but it is evident that the solution proposed according to the present invention is equally applicable to selective laser sintering, without requiring adaptations that go beyond the common knowledge of one skilled in the art.

It is known that in the field of photo-curing 3D printing technology, two basic technologies can be included, stereolithographic printing (also called SLA, acronym for Stereo-Lithography Apparatus), in which a laser emitting around 400 nm is used, for solidifying, by means of the emitted beam, a light-curable polymer in its liquid state which is in a suitable tank; and DLP printing (acronym of the English expression Digital Light Processing), according to which a photo-curable polymer (or photo-curable liquid resin) always in its liquid state in a tank, is exposed to the light radiation emitted by a device similar to a projector. A variant of DLP printing consists of printing obtained by irradiation from a liquid crystal source, for which the English acronym LCD (for the expression Liquid Crystal Display) is commonly used.

According to all these technologies, the printing process proceeds by creating one layer after another, or by solidifying a first layer adhering to a support plate and subsequently a second layer adhering to said first layer and so on until the complete object is formed. According to this technology, therefore, the data representing the three-dimensional object to be created are organized as a series of two-dimensional layers that represent cross sections of the object.

Depending on whether the light radiation comes from above or below the tank, the support plate progressively moves from top to bottom, the printing process being defined as a Top-Down type, or from bottom to top, the process being defined as a Bottom-Up type.

In particular, the Bottom-Up process, applied to both SLA and DLP type machines, as well as to LCD type machines, provides that the object extraction plate moves from the bottom upwards, with a tilting layer-by-layer movement.

In essence, the process of forming the three-dimensional object is so constituted:

a software divides the 3D model, supplied as input for printing, into an ordered succession of layers, with the thickness determined according to the technology adopted, the polymer opacity, the quantity of catalyst, the degree of precision to be obtained and the characteristics of the machine supplied, usually between 50 and 200 microns, but, in any case, a succession of a discrete and finite number of layers;

a support plate, also called extraction plate, consisting of a material capable of facilitating the gluing thereon of the first layer of polymer, moves to a predetermined distance from the first layer and waits for solidification of the first layer by the light beam (SLA or DLP/LCD); then it rises by a sufficient distance to cause the layer just formed to detach from the bottom of the tank (usually about 1 mm) and then it is lowered again by the same distance, minus the distance set for the formation of the second layer, and so on until the entire object is formed.

The resulting back-and-forth movement, also called tilting movement, has two main purposes: it allows the newly formed layer to detach from the bottom of the tank, and at the same time allows a new quantity of unpolymerized liquid resin to interpose between the newly formed layer and the bottom of the container, to allow the renewal of material still in its liquid state under the already solidified layer, for curing and forming the next layer.

The Top-Down type process proceeds in a similar way, the support plate initially being near the surface of the liquid contained in the tank, where the light beam causes solidification of the first layer; and then it lowers by a sufficient distance to ensure that the newly formed layer is arranged at the predetermined distance for forming the second layer, and so on until the entire object is formed. The Top-Down type process does not involve the need to detach the layer just formed from the bottom of the tank, but has the limit that the overall height of the printed object is linked to the tank depth.

Furthermore, as is well known, the different light sources, whether they are Laser, DLP, LCD, give different mechanical behaviours of the printed object, and in particular introduce in the printed object a diversification of the physical/chemical/mechanical behaviours in the three spatial dimensions XYZ due to the different curing methods of the single layers, which involves a spatial diversification of the forming chemical bonds.

Therefore, except in the case of printing with continuous DLP systems, as for example described in WO2017056124, with the other printing methods it is not possible to obtain mechanically and physically isotropic objects.

Preliminarily, it must be considered that, on average, a forming object can be considered "cured", therefore able to maintain the desired shape, when the chemical bonds that transform the liquid monomer into a solid polymer are in a percentage comprised between 75 and 85%, which is why the formed object, once washed, must undergo a further post-curing treatment to achieve the final chemical and mechanical stabilization (about 99% of the bonds).

Regarding the anisotropic characteristics of the objects obtained by photo-curing 3D printing, the considerations to be made change according to the light source used: laser, DLP or LCD.

In particular, using a laser for curing the single layers, we proceed with the process of forming the single layer by drawing line by line the cross section of the object to be formed, directing the laser exactly as if it were a pencil, creating vector paths which from time to time fill the desired area with a predetermined density.

It is evident that, using this type of technology, curing cannot be uniform, not only because a finite number of lines are covered, moreover arranged to form a grid, with the presence of overlaps at the intersection points, but also because the polymerization cannot be instantaneous and therefore the chemical chains are not homogeneously linked in any direction.

Unlike the laser, an LCD system allows the simultaneous polymerization of an entire layer that is forming. Consequently, if the LCD system were associated with a continuous printing process of the single layers, it should allow the creation of an isotropic object. However, due to an intrinsic technological limit of liquid crystal matrices (Liquid Crystal Display), even in this case the object obtained is not isotropic. In fact, using an LCD technology, a sort of non-bright area is generated between one pixel and the next one, which corresponds to the grid of conductive filaments that can excite, then turn off or turn on each single pixel. The same shadow creates a non-uniform lighting and therefore a non-uniform polymerization that as a matter of fact does not allow the creation of isotropic objects in any direction. Furthermore, LCD systems are affected by a phenomenon, called aliasing, which generates an imperfection of the external surface of the printed object and which will be examined in more detail hereinafter.

Finally, DLP technology uses a completely different method to generate the image. A luminous flux is incident to a chip of microscopic mirrors which, tilting at 0 and about 20 degrees respectively towards the source of the luminous flux or on the opposite side with respect to the source of the luminous flux, reflect, one pixel at a time, the image on an optical tube. The generation of scattering phenomena (diffusion), on the border between one mirror and another, effectively makes the projection homogeneous, which is why DLP technology is currently the one used for generating mechanically isotropic three-dimensional objects.

In particular, if this light source is associated with a continuous printing process, it is possible to achieve consistent behaviours in the three spatial dimensions. However, even printing systems of this type are affected by the aliasing phenomenon, described below.

The aliasing phenomenon consists in the fact that the objects generated by digital systems are represented by a plurality of minimum units, the smaller the units the greater the resolution, which on the surface of the objects may be perceptible, to the detriment of the smoothing of the surface itself. This phenomenon is also known in the field of 2D digital printing (and more generally of digital reproduction in two dimensions of text or images), wherein the corresponding minimum units are called pixels and wherein the print resolution depends on the pixel size, and where a contouring (i.e. an approximation of the outline of the images) is generated, of a size equal to the size of the pixels.

By using laser systems, the production of objects is particularly accurate in terms of the quality of the surface produced, even if, as seen above, these objects are by definition non-isotropic (in terms of mechanical behaviour), extremely slow during production and time-variant, not only according to the height of the object but also to the quantity of objects printed at the same time by the same machine. As for the DLP and LCD type projection systems, they allow instant curing of an entire layer of the object to be printed, and consequently guarantee greater mechanical performance, greater speed and time invariance, however these are characterized by a sort of XY resolution of the printed object, equal to the dimension of the pixel actually projected. In particular, in DLP systems, the greater the projection distance (and therefore the print area), the greater the size of the projected pixels, and consequently the lower the resolution of the printed object.

The aliasing phenomenon began to be perceived as relevant only very recently, while previously it was not felt, because the intrinsic inaccuracies of 3D printing systems did not allow to achieve a polymerization resolution such as to show this phenomenon on surfaces. On the contrary, the aliasing phenomenon emerged by virtue of the high technological and chemical accuracy and the extreme precision of the process characterization that have been achieved in the most recent photo-curing 3D printing systems.

To solve the aliasing problem, according to US2017/326786, a method and a stereolithographic 3D printing apparatus have been proposed, wherein the apparatus includes: a control platform capable of representing an object to be printed as a succession of layers, as well as subdividing each layer into a main area and filling areas of the outlines; a processing unit of a digital light source that is controlled by the control platform and capable of emitting a first ray of light, used for a corresponding main area of the layer during the printing phase of the object to be 3D printed; and a laser marking unit that is controlled by the control platform and capable of emitting a second ray of light used for the corresponding filling areas of the layer's outline during the printing phase of the object to be 3D printed. The solution proposed by US2017/326786, therefore, can not only implement the stereolithographic 3D printing of an object at high speed but also avoid the distortion of the edges due to the aliasing phenomenon, thus improving the accuracy of the 3D printing of the surface of the objects. However, the solution proposed by US2017/326786 exposes the main area and the filling areas of the outlines of each layer to two different types of light radiation, without any precautions in this regard, with the consequence that the two areas will have different mechanical characteristics and with the probable creation of tensions inside the final object.

A solution that addressed all these aspects was proposed in publication WO2021/166005, which proposes an isotropic type printing process without the limits due to the aliasing phenomenon on the one hand and the loss of resolution on the other, by using a source of a hybrid type photo-curing radiation, by combining a DLP type light source with a defined wavelength with a laser source having the same wavelength, capable of varying the power of the radiating flux and equipped with a galvanometric head, capable of working at variable speed, the two sources being managed by a hybrid software CAD-CAM/Slicer of a predictive type, capable of calculating the perimeters of the layers to be cured and then set the power and speed of the laser source, thus summing the benefits of DLP technology with those of laser technology, at the same time allowing continuous printing.

The solution according to WO2021/166005 is based on the concept that a hybrid software, on the one hand of the Slicer type for generating monochrome images for the DLP, on the other hand of the vector type for generating the laser paths relating to the lateral edges of the single layers, evaluating for each single layer the perimeters to be cured, is capable of defining the speed and power of the laser for each single layer, in order to take the same time and the same energy density delivered by the DLP source for curing the internal portion of the layer, thus allowing to:

polymerize the whole layer at the same time;

guarantee an isotropic polymerization;

guarantee continuous printing with the use of a laser;

solve the problem of the aliasing effect;

make the XY resolution independent of the size of the print area.

In particular, according to what is described in WO2021/166005, the DLP source has a linear polarization oriented according to a certain angle, i.e. it is associated with a polarizer configured to allow the passage of only the portion of radiation that has a linear polarization oriented according to a certain angle, and the laser source has a linear polarization oriented according to an angle orthogonal to that of the DLP source, i.e. it is associated with a polarizer configured to allow the passage of only the portion of radiation that has a linear polarization oriented according to an angle orthogonal to that of said DLP source; the laser source has a variable radiant flux power and is equipped with laser deflection means which have variable speed, the radiating flux power and the speed of the deflection means being controlled by the predictive software as a function of the required time for photo-curing each layer by means of the DLP source.

Figure 2:
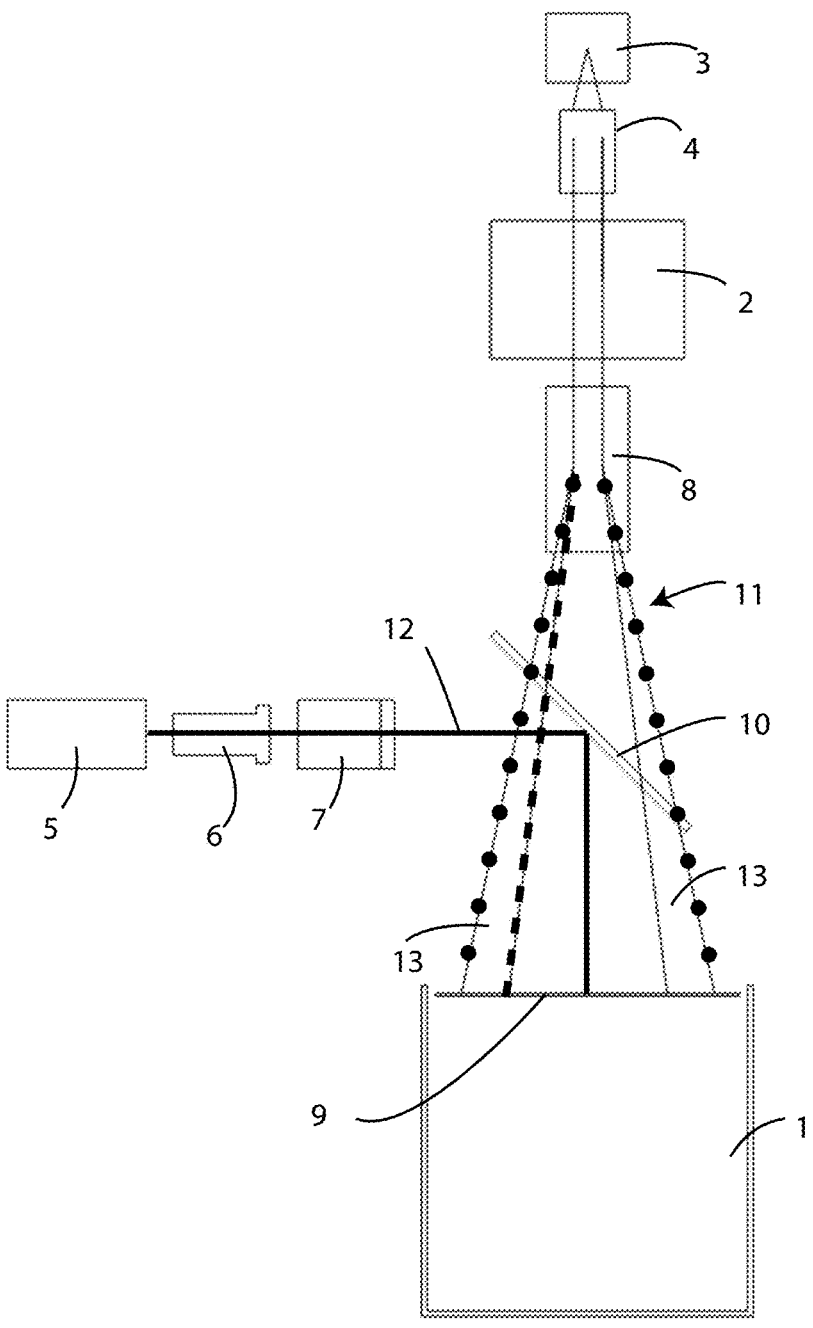

With reference to FIGS. 1 and 2 (relating to photo-polymerization 3D printing apparatuses of the Bottom-Up and Top-Down types, respectively, made according to what is described in WO2021/166005), they show the elements of an isotropic-type stereolithographic 3D printing apparatus, with hybrid light source at variable speed and power according to the known art essentially comprising a tank 1 (which can be considered as a consumable), suitable for containing a photo-curing liquid material; a monochromatic DLP light source, suitable for curing the internal portion of each layer of the object under construction, with an energy density and a residence time characteristic of each type of resin and thickness of the layer, this DLP source comprising a DLP chipset 2 which projects images by processing the light coming from a LED or lamp type light source 3, a coupling optics 4 being interposed between said DLP chipset 2 and said light source 3; and a monochromatic laser light source 5, equipped with a variable power diode, a laser beam expander 6, hereinafter also referred to as beam expander 6, and a device adpated to deflect on two dimensions the laser beam generated by the monochromatic laser light source 5 and expanded by the beam expander 6, in particular a variable speed galvanometric head 7, appropriately calibrated for curing only the outline of each single layer at the same time as the DLP source and with the same power density and timing. In order to obtain isotropic objects, the DLP monochromatic light source and the monochromatic laser light source must also have the same wavelength, i.e. they must have the same energy. The DLP monochromatic light source is also equipped with an expansion and focus optical group 8, adapted to expand the width of the projection, to achieve the maximum useful area with the minimum possible projection distance. The apparatus also comprises a support plate 9, adapted to house on its surface facing the light sources, the overlapping layers that will form the object to be printed, obtained by photo-curing the photo-curable liquid material by radiation from the two light sources.

Furthermore, with reference to FIG. 1, relating to a Bottom-Up type photopolymerization 3D printing apparatus, the bottom of the tank 1 is transparent to the radiation of both light sources.

The characteristic of the photopolymerization 3D printing apparatuses according to WO2021/166005, whether they are of the Bottom-Up or Top-Down type, is the presence of a polarization coupling optics 10, also called polarizer 10, whose function is to polarization-couple the light beams coming from the two light sources, for obtaining the spatial overlapping of the two light beams (coaxiality) while maintaining the same wavelength. Assuming to be able to identify (or decompose) the polarization states of the two light beams along two directions orthogonal to each other and orthogonal to the direction of propagation of each of them, according to WO2021/166005 the use of said polarization coupling optics 10 (polarizing beam combiner 10) allows to transmit one of the aforementioned polarization states (typically the so-called "p" polarization) and to reflect the state orthogonal thereto (typically the so-called "s" polarization), one of said light sources having a linear polarization oriented according to a certain angle and the other having an orthogonal linear polarization, so that the polarization of the light beam of one of said light sources is perpendicular to the plane of incidence on the coupling optics (s-pol), the light beam being reflected, while the polarization of the light beam of the other is parallel to the same plane (p-pol), the light beam then being transmitted. In the printing apparatuses represented in FIGS. 1 and 2, the polarization of the light beam 11 from the DLP source is parallel to the plane of incidence on the coupling optics 10 and is transmitted and the polarization of the light beam 12 of the laser source is perpendicular to the plane of incidence on the coupling optics 10 and is reflected, the two beams spatially overlapping, due to the polarization coupling, while maintaining the same wavelength.

The polarization orientations of the two light beams shown in FIGS. 1 and 2 are purely indicative. Similarly, with the aim of spatially overlapping the beams coming from the two light sources, the basic condition of having linear polarizations orthogonal to each other is also guaranteed by inverting the position of the DLP source and the laser source with respect to the coupling optics.

Typically, the DLP type sources used for this application emit a linearly polarized beam according to a first determined direction, or a randomly polarized beam, while the laser type sources are laser diodes that emit a linearly polarized beam, according to a second determined direction. In order to obtain the spatial overlapping of the two beams, laser and DLP, it is necessary that they are incident to the polarization optics with linear polarization, one oriented perpendicular to the plane of incidence (s-pol) and the other parallel thereto (p-pol). If the polarization axes of one or both beams are not linear or are not oriented according to this definition, it is always possible to correct their orientation, by means of optics which are called "polarizers".

The solution described in WO2021/166005 has application limits, relating to the scalability of the print area (in XY). Such limits are due to the polarizer acceptance angle, i.e. the largest allowable deviation from the designed angle of incidence at which the polarizer continues to operate within specifications.

In this regard, it is known that the polarizers on the market can be divided into flat polarizers and cubic polarizers. Both these configurations have an intrinsic constructive limit on the angle of incidence of the transmitted light beam (in the stereolithographic 3D printing systems described in WO2021/166005 that coming from the DLP source), and of the reflected light beam, which remains included in a range between +/−7° unless further limited. In the event that the passing beam and/or the reflecting beam have an angle greater than this limit, the polarizer loses its effectiveness, being no longer capable to transmit/reflect the incident light, thus losing the function for which this device has been described in WO2021/166005, i.e. being no longer capable, above this angle, of recreating the coaxial beam useful for hybrid polymerization. It is also known that other forms of polarizing optical elements exist on the market, whose operation is based on particular surface nanostructures, called Wire Grids, which allow a much wider acceptance angle for the light beams. These elements, if used in output to the standard DLP and Laser optics, however, have very large dimensions and therefore very high costs, which prevent their use.

With reference to FIGS. 1 and 2, the image generated by the expansion and focus optical block 8 of the DLP has a portion with an angle greater than 14° (+/−7°), indicated by numerical reference 13, which is therefore filtered by the polarizer, resulting in a loss of useful area. Usually, DLP systems for additive applications have in fact projection angles well above 30° (+/−15°) to increase the useful print area by reducing the projection distance.

This is an intrinsic limit of stereolithography 3D printing technology with hybrid lighting, and a severe limit for the market development. In fact, the scalability capacity of the stereolithographic 3D printing system with hybrid lighting system, capable of maintaining extreme resolutions with large print areas, is severely limited by the maximum acceptance angle of the polarizer. Currently, the only way to overcome this problem is to increase the distance between the source and the polymerization area. On the other hand, this solution is impracticable for two reasons:

strong loss of power by the DLP source, due to the increased distance and loss of the whole active area, and unacceptable increase in size of the three-dimensional printers to be built.

Therefore, a need exists in this specific field for photo-curing or selective laser sintering 3D printing apparatuses with a hybrid lighting system at a constant wavelength and variable power and speed, with an optical coupling and expansion system, wherein the scalability capacity is not limited by the maximum acceptance angle of the polarizer and wherein the overall size is maintained compact.

This need is fullfilled by the photo-curing or selective laser sintering 3D printing apparatus with a hybrid lighting system with a constant wavelength and variable power and speed, with an optical coupling and expansion system, in particular with an optical pre-or post-coupling and fixed or variable post-expansion system according to the present invention which also offers further advantages which will become clear in the following.

The aim of the present invention is therefore to provide a photo-curing or selective laser sintering 3D printing apparatus with a hybrid lighting system with a constant wavelength and variable power and speed, with an optical coupling and expansion system, in particular with a system of pre-or post-optical coupling and fixed or variable post-expansion which allow to overcome the limits of stereolithographic 3D printing systems with a hybrid lighting system according to the known art and to obtain the technical results previously described.

A further aim of the invention is that said 3D printing apparatus can be made with substantially low costs, regarding both production and management costs.

Last but not the least aim of the invention is to propose a photo-curing or selective laser sintering 3D printing apparatus with a hybrid lighting system at a constant wavelength and variable power and speed, with an optical coupling and expansion system, in particular with an optical pre-or post-coupling and fixed or variable post-expansion system which is simple, safe and reliable.

It is therefore a first specific object of the present invention a photo-curing or selective laser sintering 3D printing apparatus with a hybrid lighting system at a constant wavelength and variable power and speed, wherein said apparatus includes:

a first light source and related optical devices of conditioning the light beam, for the emission and processing of a first light beam for photo-curing or sintering said object, wherein said first light beam has a predetermined wavelength and a linear polarization oriented according to a certain angle;

a second light source and related optical devices of conditioning the light beam, for the emission and processing of a second light beam for photo-curing or sintering said object, wherein said second light beam has a wavelength equal to that of said first light beam and a linear polarization oriented according to an angle orthogonal to that of said first light beam;

a polarizer arranged along the path of said first light beam and said second light beam, wherein said polarizer is adapted to polarization-couple said first light beam and said second light beam, to obtain their spatial overlapping (coaxiality) while maintaining the same wavelength; wherein at least one of said light sources has a variable power and is associated with deflection means of the related light beam, wherein said deflection means have a variable speed, said power and said speed of said deflection means being controlled by a predictive software as a function of the required time for the photo-curing or sintering and for imparting the same energy density to each part of said object, characterized in that a conditioning, expansion and/or focusing optical group is arranged between said polarizer and said object, which is adapted to the conditioning, the combined expansion and/or focusing of said first light beam and said second light beam polarization-coupled to each other.

Preferably, according to the present invention, said first light source is a DLP type source, which comprises a LED or lamp type light source, a DLP chipset and a coupling optics interposed between said DLP chipset and said light source and said second light source is a monochromatic laser light source, equipped with a variable power diode, a laser beam expander and a two-dimensional deflection device of the laser beam generated by said monochromatic laser light source and expanded by said laser beam expander.

Even more preferably, according to the invention, said deflection device is a variable speed galvanometric head and an optics for adapting and optimizing the light beam can be interposed between said first DLP type light source and said polarizer.

In particular, according to the invention, said polarizer is adapted to transmit the light beam of said first light source and to reflect the light beam of said second light source, or vice versa.

Alternatively, again according to the invention, said polarizer can be a flat polarizer or a cubic polarizer.

Using the previously defined 3D printing apparatus in a bottom-up type photopolymerization three-dimensional printing system is also a second specific object of the present invention.

Using the previously defined 3D printing apparatus in a top-down type photopolymerization three-dimensional printing system is a third specific object of the invention.

Finally, using the previously defined 3D printing apparatus in an SLS laser sintering three-dimensional printing system for polymerization/sintering/melting of plastic powders is a fourth specific object of the present invention.

Figure 3:
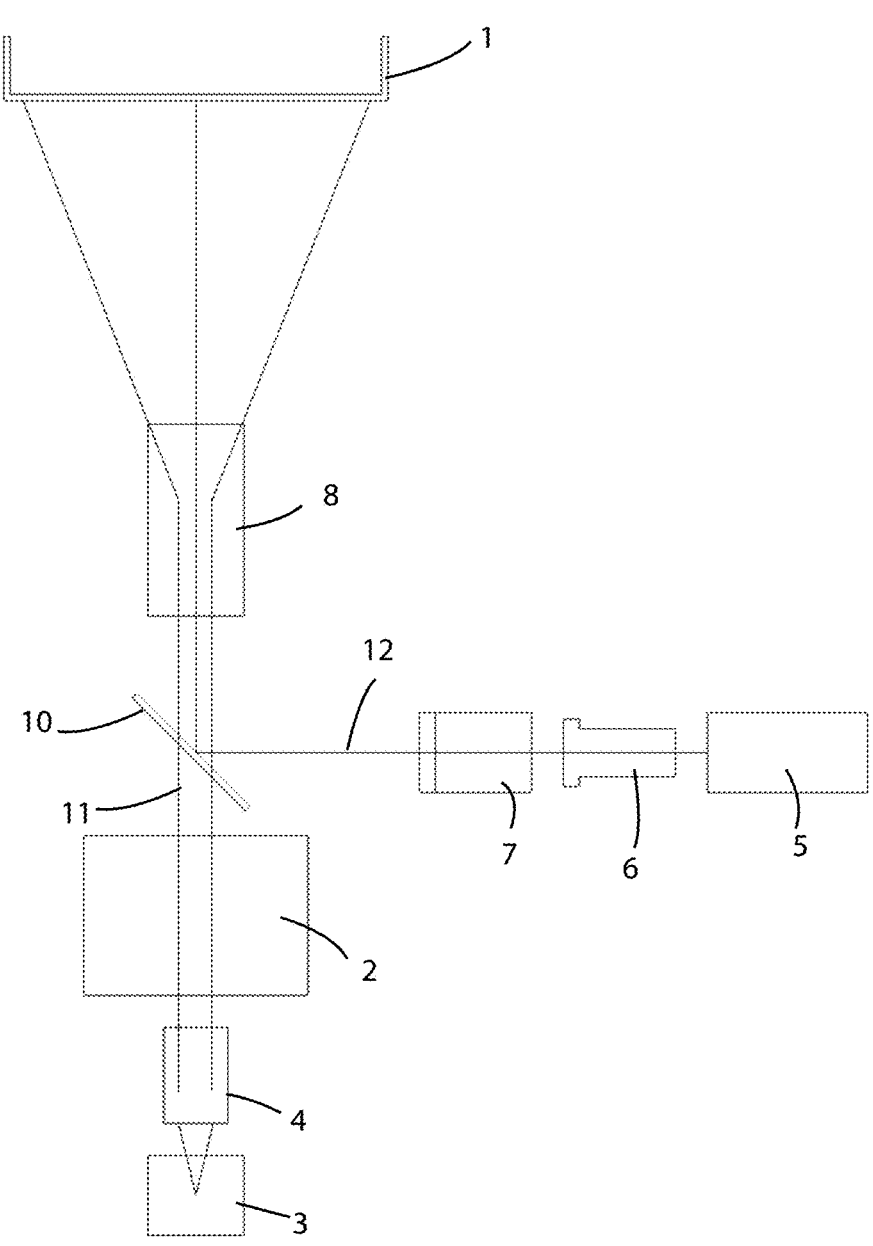
Figure 4:
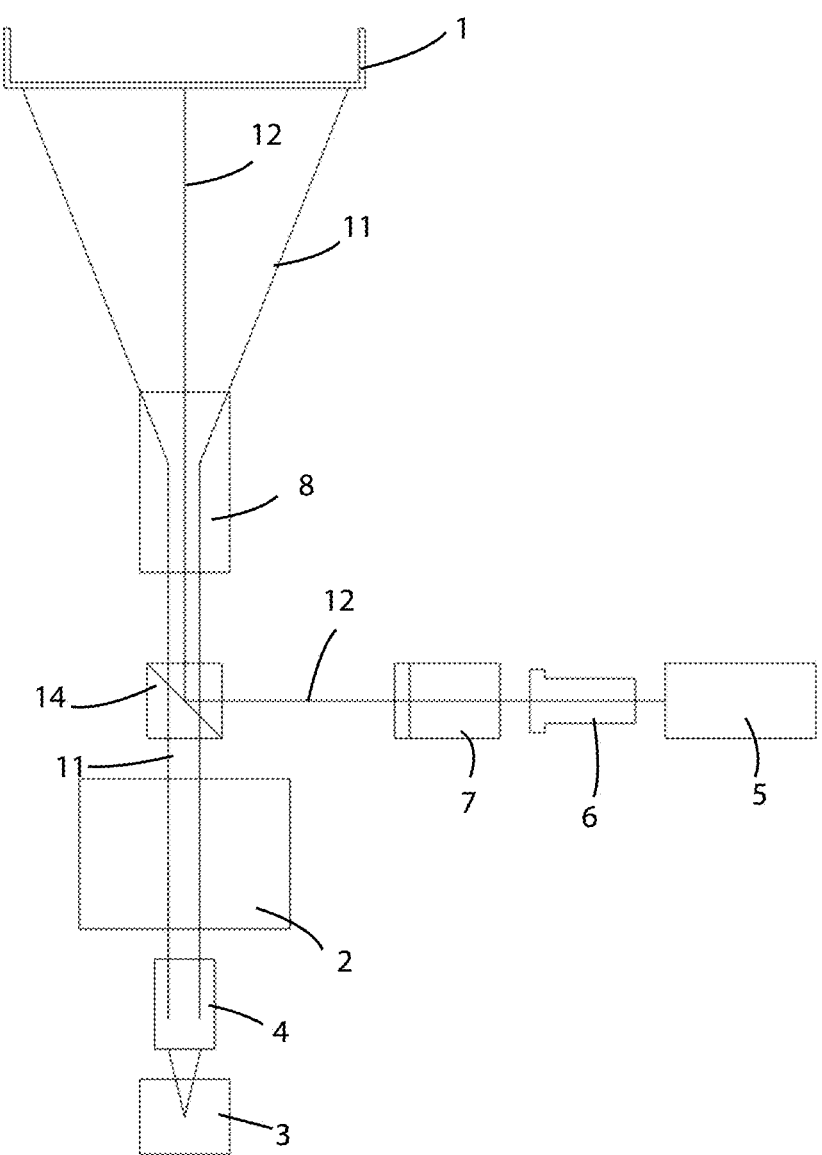
Figure 5:
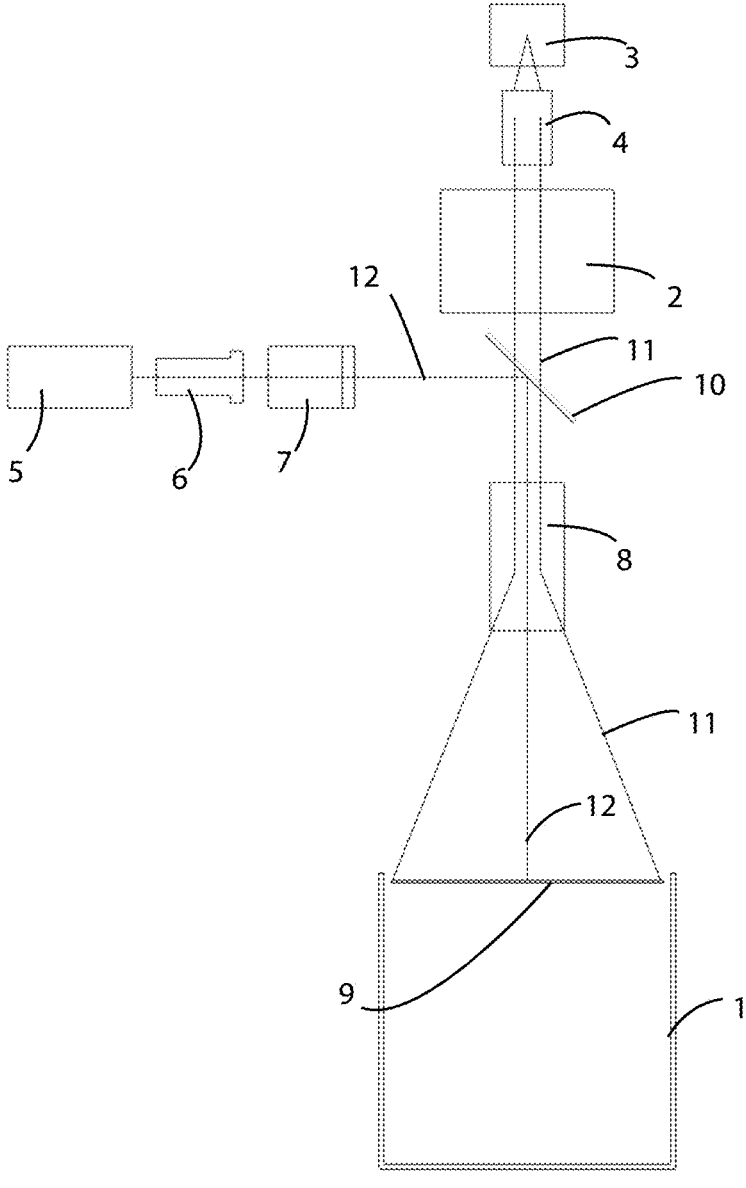
Figure 6:
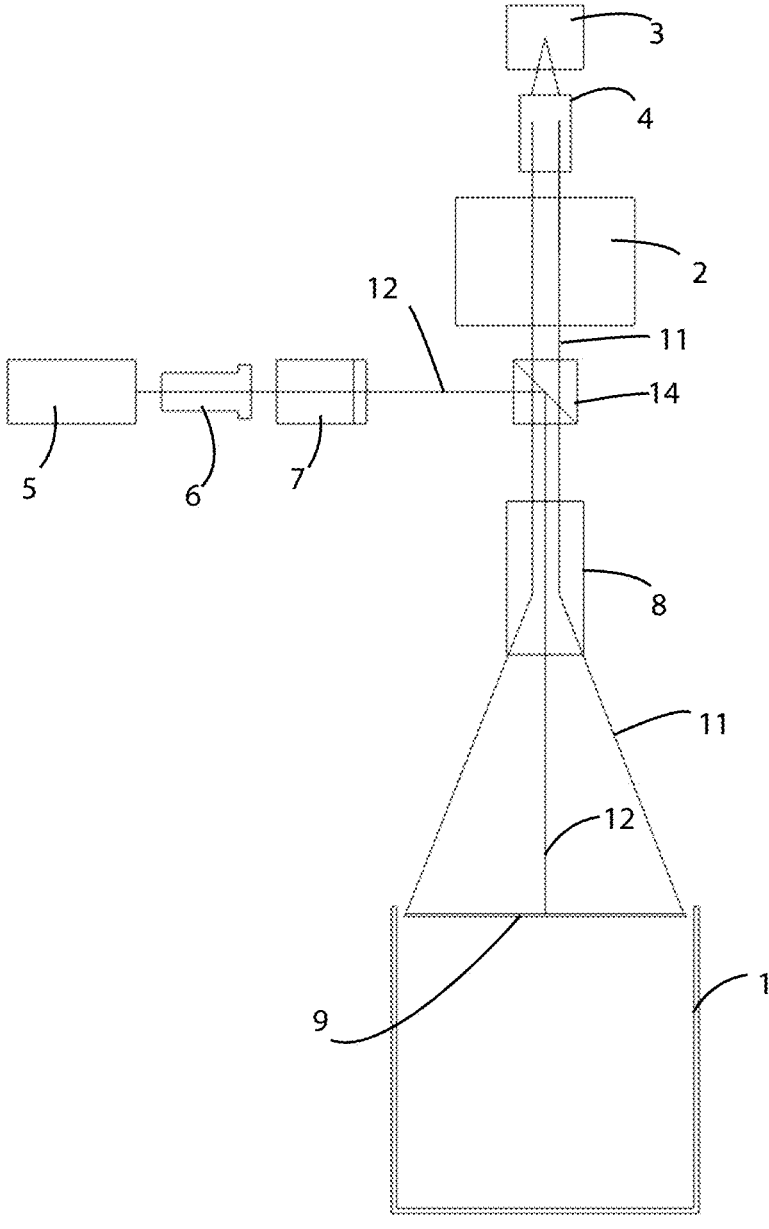
Figure 7:
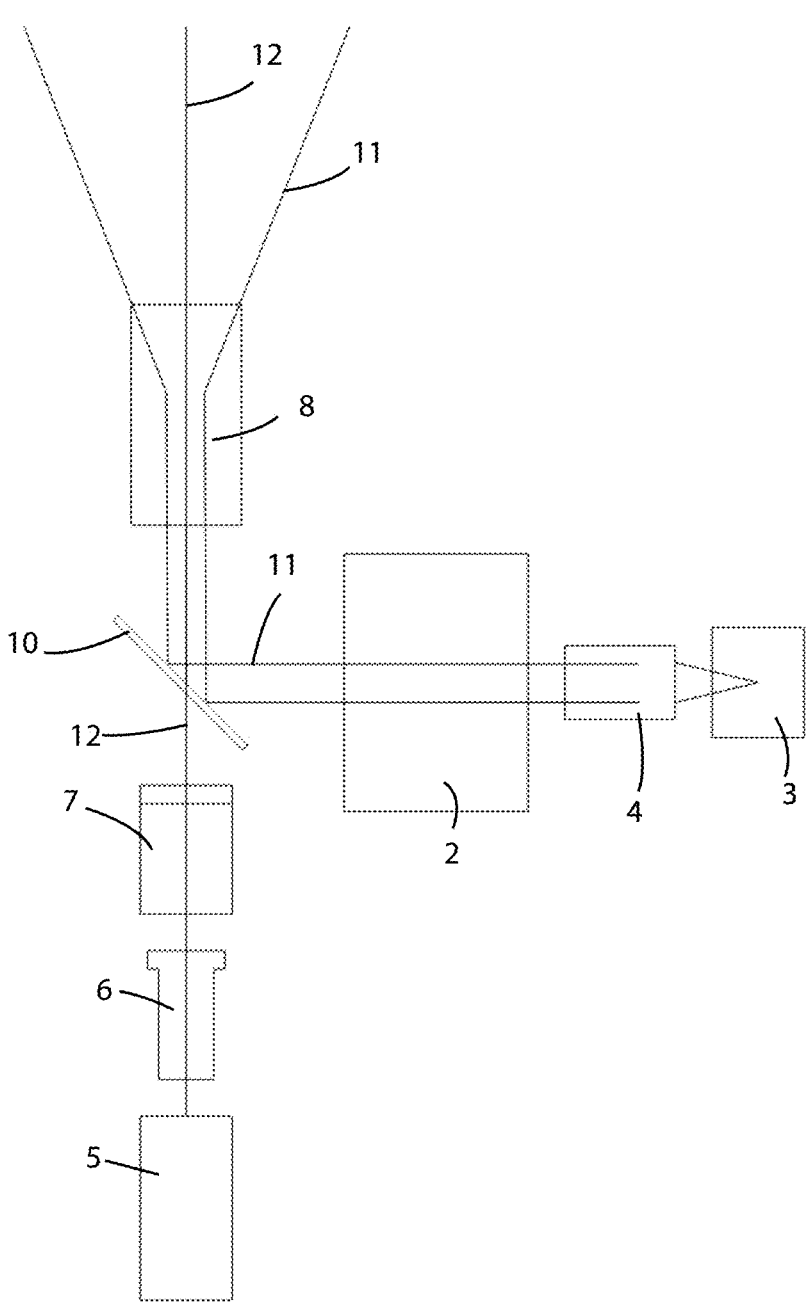
Figure 8:
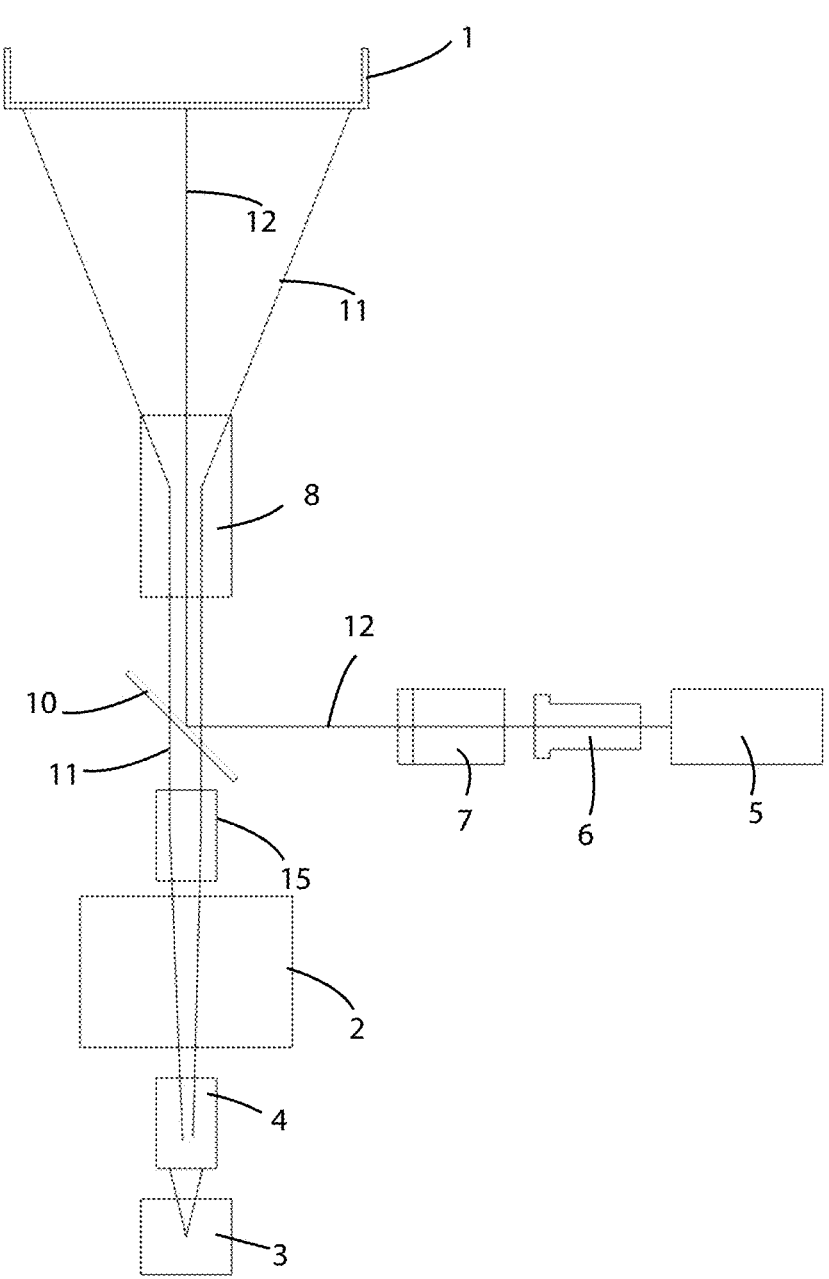
Figure 9:
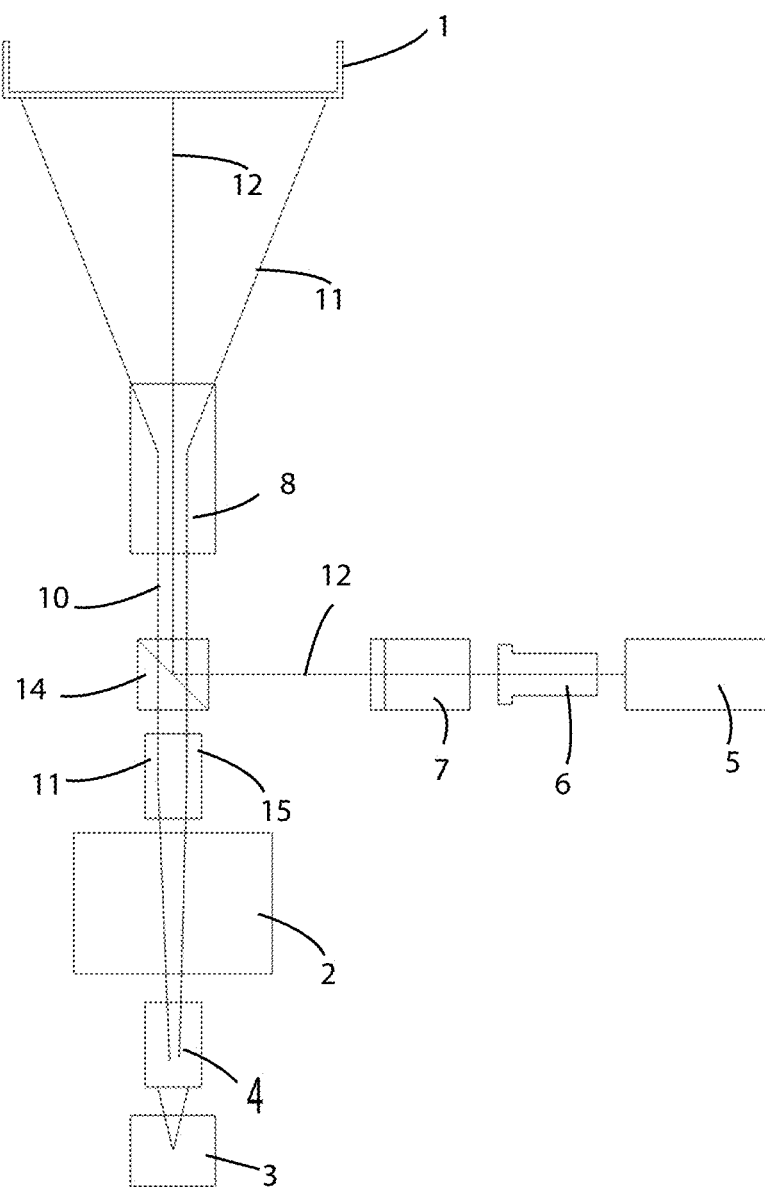
Figure 10:
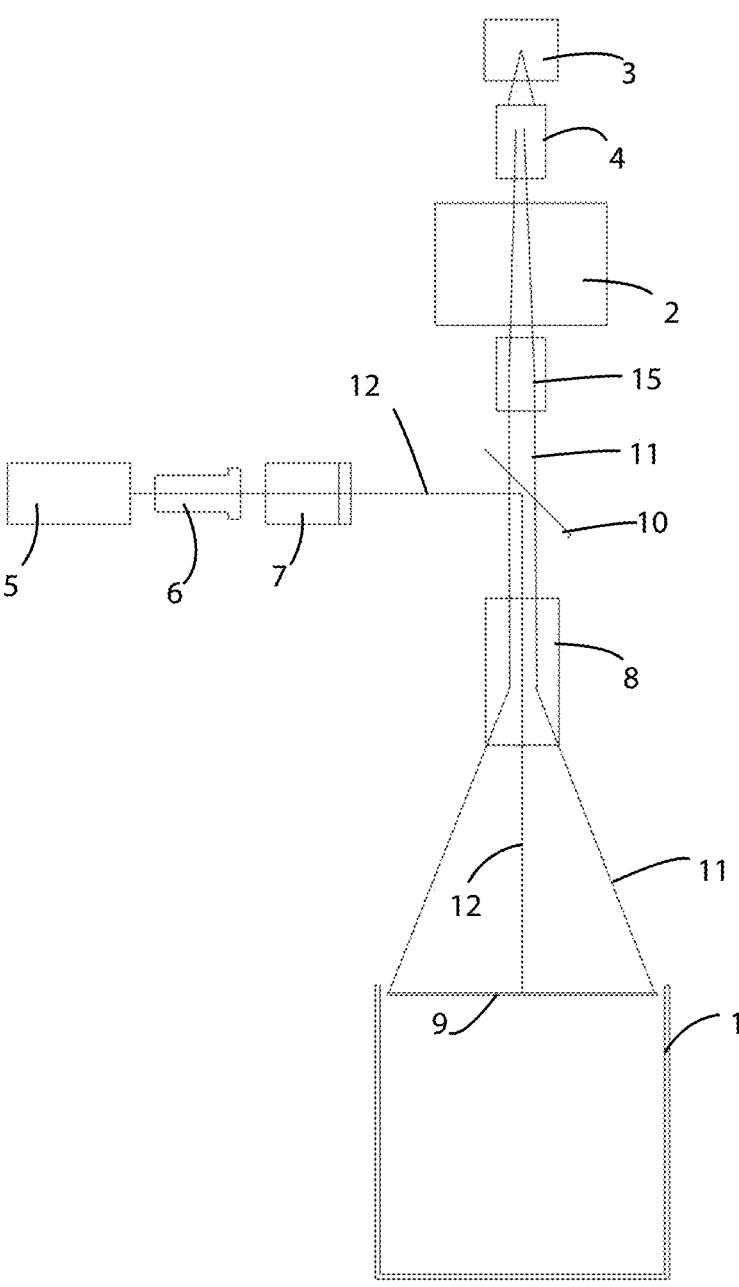
Figure 11:
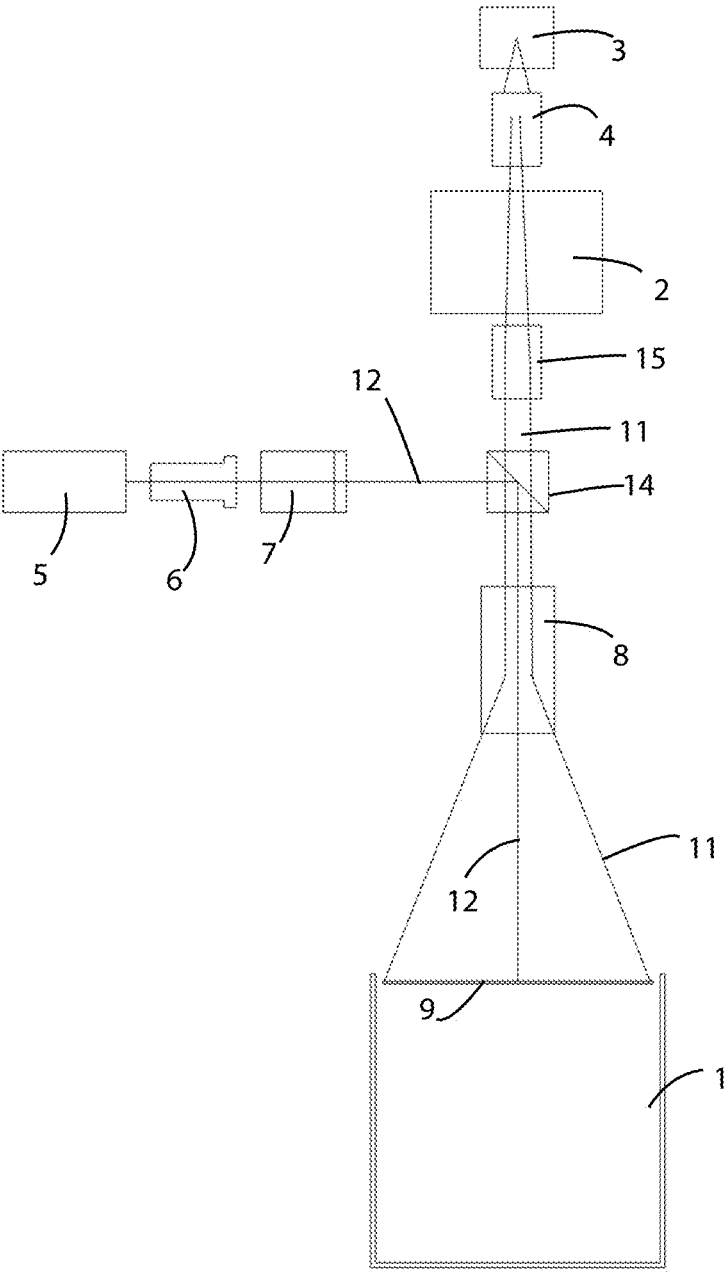

The present invention will now be described, for illustrative but not limitative purposes, according to a preferred embodiment thereof, with particular reference to the figures of the attached drawings, in which:

FIG. 1 shows a schematic representation of a bottom-up type photopolymerization 3D printing apparatus, according to the known art, FIG. 2 shows a schematic representation of a top-down type photopolymerization 3D printing apparatus, according to the known art, FIG. 3 shows a schematic representation of a bottom-up type photopolymerization 3D printing apparatus, according to a first embodiment of the present invention, FIG. 4 shows a schematic representation of a bottom-up type photopolymerization 3D printing apparatus, according to a second embodiment of the present invention, FIG. 5 shows a schematic representation of a top-down type photopolymerization 3D printing apparatus, according to a third embodiment of the present invention, FIG. 6 shows a schematic representation of a top-down type photopolymerization 3D printing apparatus, according to a fourth embodiment of the present invention, FIG. 7 shows a schematic representation of a bottom-up type photopolymerization 3D printing apparatus, according to a fifth embodiment of the present invention, FIG. 8 shows a schematic representation of a bottom-up type photopolymerization 3D printing apparatus, according to a sixth embodiment of the present invention, FIG. 9 shows a schematic representation of a bottom-up type photopolymerization 3D printing apparatus, according to a seventh embodiment of the present invention, FIG. 10 shows a schematic representation of a top-down type photopolymerization 3D printing apparatus, according to an eighth embodiment of the present invention, and FIG. 11 shows a schematic representation of a top-down type photopolymerization 3D printing apparatus, according to a ninth embodiment of the present invention.

Referring preliminarily to FIGS. 3-6, wherein the components already described with reference to FIGS. 1 and 2 relating to the known art will be indicated by the same numerical references and will not be described again, a first implementation of the present invention is shown, respectively applied to a photopolymerization 3D printing apparatus of bottom-up type (FIGS. 3 and 4), and top-down type (FIGS. 5 and 6) equipped with a flat polarizer 10 (FIGS. 3 and 5) or a cubic polarizer 14 (FIGS. 4 and 6).

In particular, according to this first implementation of the present invention, it is proposed to arrange on the path of the two light beams, i.e. on the path of the light beam 11 of the DLP source and on the path of the light beam 12 of the laser source, first a pre-coupling system of the two beams and only subsequently an expansion and focus optical group 8, for their combined expansion. This solution allows to completely obviate the problem previously described due to the maximum acceptance angle of the polarizer (both the flat type 10 and the cubic type 14). In particular, according to the present invention, it is proposed to interpose the polarizer (which can indifferently be of the flat 10 or cubic 14 type, depending on the type of bandwidth to be intercepted) immediately at the output of the light beam 11 coming from the DLP processor, and subsequently, once both beams are coupled, to insert an expansion and focus optical group 8, suitably sized for the print area of interest, capable of expanding both optical flows, optimizing the working angle, the focus and the size of the printing plate for each type of printer you want to build. The expansion and focus optical group 8 is also sized to limit the distortions introduced by the optics, in order to reduce the barrel distortion effect which is characteristic of DLP systems.

This first proposed solution concerns not only both bottom-up type and top-down type photopolymerization three-dimensional printing systems, but also SLS laser sintering systems (in this particular case in the infrared band) for polymerization/sintering/melting of plastic powders.

Furthermore, what has just been described is equally applicable both to the case wherein the light beam 11 of the DLP source is transmitted by the polarizer and the light beam 12 of the laser source is reflected, and to the opposite case, wherein the light beam 12 of the laser source is transmitted by the polarizer and the light beam 11 of the DLP source is reflected. In both cases, the method and the apparatus for the stereolithographic 3D printing according to the present invention have the same technical development.

By way of example, FIG. 7 shows a bottom-up type photopolymerization 3D printing apparatus wherein the light beam 11 of the DLP source is reflected by a polarizer 10 and the light beam 12 of the laser source is transmitted.

With reference to FIGS. 8-11, a second implementation of the present invention is shown, respectively applied to a photopolymerization 3D printing apparatus of the bottom-up type (FIGS. 8 and 9), and the top-down type (FIGS. 10 and 11) equipped with a flat type polarizer 10 (FIGS. 8 and 10) or a cubic type polarizer 14 (FIGS. 9 and 11).

In particular, according to this second implementation of the present invention, the aim is to further optimize the performance of the printing apparatus, in order to achieve the maximum optimization characteristics, in terms of:

quality of the image projected on the effective area,
optimization of aberrations,
optimization of the barrel distortion effect
uniform energy density at the interface, and
optimization of the working dimensions of the polarizer and of the acceptance angles.

For this purpose, according to the present invention, it is proposed to interpose, immediately after the output of the light beam 11 of the DLP source, and immediately before the coupling system with polarizer, an optics 15 for adapting and optimizing the light beam 11 of the DLP source. This configuration, on the one hand, would result in an increase in manufacturing costs, but would also allow a further increase in the quality of the resulting image at the polymerization interface, relying on a correction of the light beam 11 of the DLP source before coupling with the light beam 12 of the laser source and above all before the focus and expansion system.

As for the first implementation, this implementation solution can also be adopted with all wavelengths of interest, for all photopolymerization 3D printing technologies, whether they are of bottom-up or top-down type or by plastic laser sintering SLS.

Furthermore, also in this case, the proposed solution is equally applicable both to the case in which the light beam 11 of the DLP source is transmitted by the polarizer and the light beam 12 of the laser source is reflected, and to the opposite case, in which the light beam 12 of the laser source is transmitted by the polarizer and the light beam 11 of the DLP source is reflected. In both cases, the stereolithographic 3D printing method and apparatus according to the present invention have the same technical development.

The present invention has been described for illustrative, but not limitative purposes, according to its preferred embodiments, but it is to be understood that variations and/or modifications may be made by those skilled in the art without thereby departing from the relative scope of protection, as defined by the attached claims.

The invention claimed is:

1. A photo-curing 3D printing apparatus with a hybrid lighting system at a constant wavelength and variable power and speed, wherein said apparatus includes:

a tank for receiving a photocurable liquid material;

a first light source for generating a light beam and related optical devices of conditioning the light beam, for the emission and processing of the light beam for photo-curing a photocurable liquid material in the tank to form an object in a build space, wherein said light beam has a predetermined wavelength and a first linear polarization oriented according to a certain angle;

a second light source for generating a projection of light images and project one or more light images and related optical devices of conditioning the one or more second light images, for the emission and processing of the one or more light images for photo-curing the photocurable liquid material in the tank to form said object, wherein said one or more light images have a wavelength equal to that of said light beam and a second linear polarization different from the first polarization and oriented according to an angle orthogonal to that of said light beam;

a polarizer arranged in the path of said light beam and said one or more light images towards the tank, wherein said polarizer is adapted to polarization-couple said first light beam and said one or more light images, to obtain a coaxiality while maintaining the same wavelength; wherein at least one of said light sources has a variable power and is associated with a deflection means of the related light beam, wherein said deflection means have a variable speed, power and speed of said deflection means being controlled by a predictive software as a function of the required time for the photo-curing and for imparting the same energy density to each part of said object, wherein a conditioning, expansion and/or focusing optical group is arranged distal of said polarizer and proximal of said build space, which is adapted to the conditioning, the combined expansion and/or focusing of said light beam and said one or more light images polarization-coupled to each other.

2. The 3D printing apparatus according to claim 1, wherein said second light source is a DLP source, the DLP source comprises a LED or lamp light source, a DLP chipset and a coupling optics interposed between said DLP chipset and said LED or lamp light source and said first light source is a monochromatic laser light source, provided with a variable power diode, with a laser beam expander and a two-dimensional deflection device of the laser beam generated by said monochromatic laser light source and expanded by said laser beam expander.

3. The 3D printing apparatus according to claim 2, wherein said deflection means is a variable speed galvanometric head.

4. The 3D printing apparatus according to claim 2, wherein an optics for adapting and optimizing the light beam is interposed between said DLP source and said polarizer.

5. The 3D printing apparatus according to claim 1, wherein said polarizer is adapted to transmit the light beam of said second light source and to reflect the one or more light images of said second light source, or vice versa.

6. The 3D printing apparatus according to claim 1, wherein said polarizer is a flat polarizer.

7. The 3D printing apparatus according to claim 1, wherein said polarizer is a cubic polarizer.

8. The 3D printing apparatus according to claim 1, wherein it is configured as a bottom-up photopolymerization 3d printing system.

9. The 3D printing apparatus according to claim 1, wherein it is configured as a top-down photopolymerization 3d printing system.

* * * * *